E. K. Collins,
Making Staves.
N° 17,871.   Patented July 28, 1857.
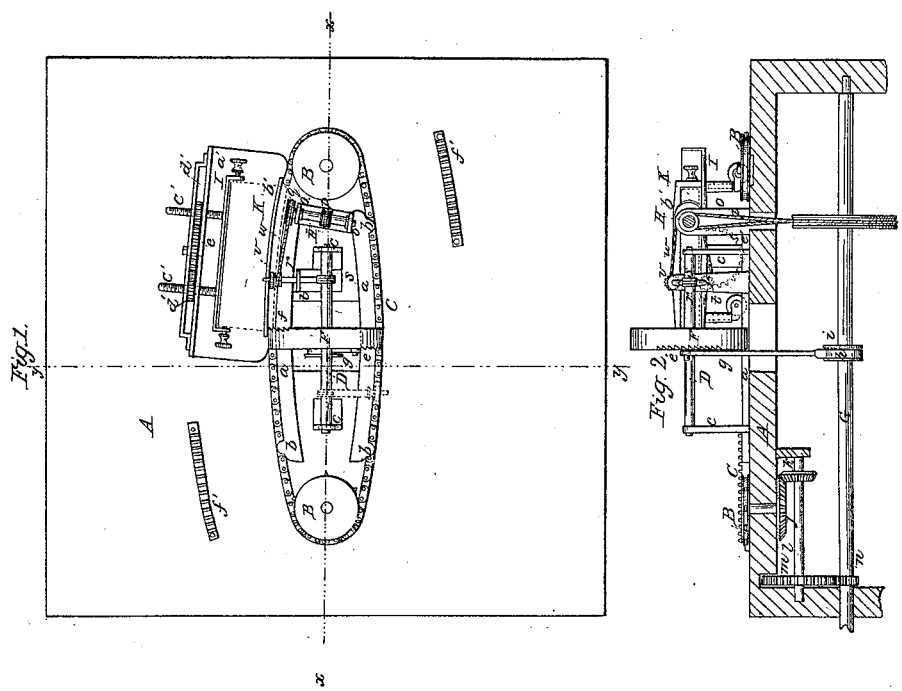

UNITED STATES PATENT OFFICE.

E. K. COLLINS, OF CAMBRIDGE, MASSACHUSETTS.

METHOD OF SAWING STAVES FROM THE BOLT AND DRESSING THEIR EDGES SIMULTANEOUSLY.

Specification of Letters Patent No. 17,871, dated July 28, 1857.

*To all whom it may concern:*

Be it known that I, E. K. COLLINS, of Cambridge, in the county of Middlesex and State of Massachusetts, have invented a new and Improved Machine for Sawing and Dressing Staves for Casks; and I do hereby declare that the following is a full, clear, and exact description of the same, reference being had to the annexed drawings, making a part of this specification, in which—

Figure 1 is a plan or top view of my improvement. Fig. 2 is a vertical section of ditto, taken in the line (x) (x) see Fig. 1. Fig. 3 is also a vertical section of ditto, taken in the line (y) (y) see Fig. 1.

Similar letters of reference indicate corresponding parts in the several figures.

This invention has for its object the sawing of staves from the "bolt," the jointing of the same and also giving them the proper taper by which the bilge at the cask is formed, the whole being done at one operation.

The invention consists in the peculiar means employed for attaining the object alluded to, as will be hereinafter fully shown and described.

To enable those skilled in the art to fully understand and construct my invention, I will proceed to describe it.

A represents a horizontal bed on which two pulleys B, B, are placed and also two curved guide bars (a) (a) as shown in Fig. 1. C represents an endless chain which passes around the two pulleys B, B, the chain being at the outer sides of the bars (a) (a). Each bar (a) is provided with a lip (b) one at each end, said lips projecting over the chain and serving as guides to the same to keep it in proper place.

D is a shaft the ends of which are fitted in the upper part of uprights (c) (c) attached to the bed A. On the shaft D a wheel E is placed and a band saw F, is secured to the periphery of said wheel. The wheel has segments or portions (d) (d) of it cut away, as shown clearly in Fig. 3, so that the cutting portions of the band may be exposed. The band of the saw, opposite the recesses (d) in the wheel is toothed at opposite sides as shown at (e) (f) a portion of teeth at each side of the band being shown in Fig. 1. To the wheel E a pitman (g) is attached, the lower end of said pitman having a strap (h) attached to it, which strap is placed around an eccentric (i) on a driving shaft G underneath the bed A, see Figs. 2 and 3.

The axis of one of the pulleys B extends through the bed A and has a bevel wheel (j) on its lower end. This wheel (j) gears into a pinion (k) on a shaft (l) which has a toothed wheel (m) on it, said wheel gearing into a pinion (n) on the driving shaft G.

H represents a shaft, the ends of which are fitted in uprights (o) (o) on the bed A. This shaft H is driven by a belt (p) from the shaft G and a pulley (q) is placed on one end of the shaft H.

On the shaft D two arms (r) (r) are placed loosely. The ends of these arms through which the shaft D passes may be jointed together as shown at (s) Figs. 1 and 2. These arms (r) (r) pass through apertures in an upright (t) and have a spiral spring (u) attached to them as shown in Fig. 3. On the end of each arm (r) a "bur" or rotating cutter (v) is placed, said cutters being driven by a belt (w) from the pulley (q) on shaft H.

I represents a bed or plate which is attached by a bar J, to the chain C. On the bed I a bar (a') is placed, to which bar the "bolt" K is clamped the outer edge of the "bolt" passing through a guide loop or frame (b'). The outer side of the bar (a') has two screws (C') (C') attached to it and these screws pass through a ledge at the outer side of the bed or plate and nuts (d') are placed on the screws, the nuts being toothed and having a toothed wheel (e') between them, the nuts gearing into the wheel.

To the bed A and in the line of the path of the wheel (e') racks (f') are attached, one opposite each pulley B, B, and at opposite sides of the chain C, see Fig. 1.

The operation is as follows: The "bolt" K is sawed or got out of the required size, in rectangular form, and clamped or dogged to the bar (a') the outer edge of the bolt projecting through the frame (a'). Motion is given the shaft G in any proper manner, and as said shaft rotates a reciprocating rotating motion is given the band saw F by means of the pitman (g) actuated by the eccentric (i). The bed or plate I is also moved in the direction indicated by the arrow, the plate being moved by the endless chain C which is actuated by the gearing (j) (k) (m) (n) as described. As the bolt K passes the band saw, the staves are sawed therefrom the bolt running past the saw in curved form corresponding to the form of the bars (*a*), and the staves will consequently be sawed from the bolt in proper curved form, and just before the bolt reaches the saw, its side passes between the arms (*r*) (*r*) one of which rests upon the upper edge of the frame (*b'*) and the other against the lower edge, and the upper and lower edges of the bolt will be cut or beveled by the rotating cutters (*v*) (*v*). The staves therefore are jointed just previous to being cut, and the upper and lower edges of the frame (*b'*) are made of rounded or curved form, see Fig. 2, so that the staves will be cut of taper form to allow for the bilge of the casks. The "bolt" K is fed forward just previous to passing around the pulleys B, B, in consequence of the wheel (*e'*) passing into the racks (*f'*) (*f'*), said racks being made of varying lengths according to the desired thickness of the stave.

I would remark that one or more beds or plates I may be attached to the chain C, so that a plurality of "bolts" may be sawed up into staves at the same time. I would also remark that two sets of arms (*r*) are required, a set at each side of the band saw F.

The within described machine is quite simple and will operate efficiently and rapidly.

I am aware that band saws have been previously used, the saws being placed on a rotating wheel, and having a continuous and also reciprocating rotary motion for the purpose of sawing fellies and such articles. I do not therefore claim the employment or use of a band saw separately considered or irrespective of the arrangement herein shown but

Having thus described my invention, what I claim as new and desire to secure by Letters Patent, is—

The band saw or saws F, endless chain C, which gives a continuous feed motion to one or more beds or plates I attached, curved bars (*a*) (*a*), the rotating cutters (*v*) (*v*), the racks (*f*) (*f*), and the gearing (*d'*) (*d'*) (*l'*), and screws (*c'*), connected with the bar (*a'*), when they are arranged and combined to operate conjointly as shown, for the purpose of sawing, jointing, and dressing staves, at one operation, as set forth.

ELISHA K. COLLINS.

Witnesses:
SUMNER SARGENT,
HERMAN P. KINGMAN.